S. F. KING.
SECTIONAL PIPE AND CLAMP CONNECTION THEREFOR.
APPLICATION FILED NOV. 7, 1914. RENEWED MAY 11, 1916.
1,208,708.
Patented Dec. 12, 1916.
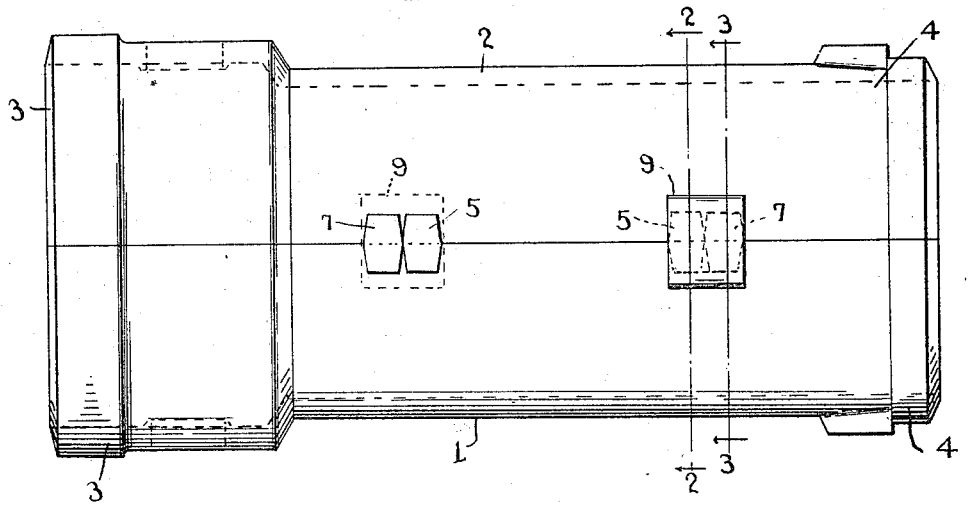
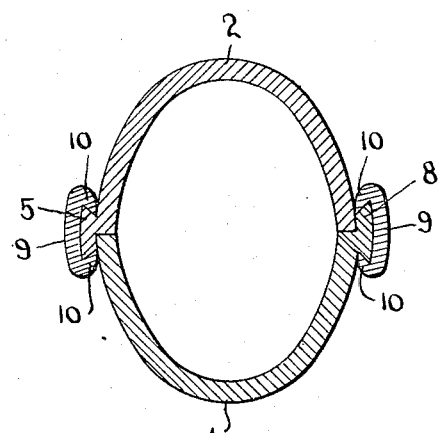
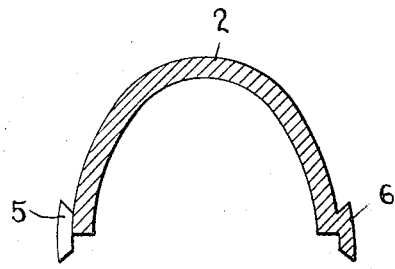
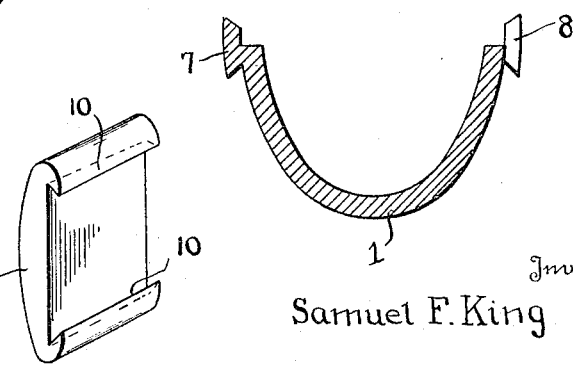
Inventor
Samuel F. King

UNITED STATES PATENT OFFICE.

SAMUEL F. KING, OF BIRMINGHAM, ALABAMA, ASSIGNOR TO ROBERT C. WHITE.

SECTIONAL PIPE AND CLAMP CONNECTION THEREFOR.

1,208,708.   Specification of Letters Patent.   Patented Dec. 12, 1916.

Application filed November 7, 1914, Serial No. 870,825. Renewed May 11, 1916. Serial No. 96,945.

*To all whom it may concern:*

Be it known that I, SAMUEL F. KING, a citizen of the United States of America, residing at Birmingham, in the county of Jefferson and State of Alabama, have invented certain new and useful Improvements in Sectional Pipes and Clamp Connections Therefor, of which the following is a specification.

My invention relates to culvert pipe and like pipe which is formed in longitudinal sections which are connected together so as to hold them against relative displacement. In the case of culvert pipe, to which my invention more particularly applies, it is desirable to so interlock the sections that they will be held against transverse or endwise horizontal displacement and also against vertical displacement which usually takes place when the bed under the pipe subsides or becomes undermined so that the lower half section tends to drop away from the upper section.

The object of my invention is to interlock the pipe sections in the several respects mentioned above by an extremely simple and economical locking means which is positive in its action and which accomplishes its ends without appreciably increasing the weight or cost of the pipe.

With these objects in view, my invention consists in the novel construction and arrangement of parts hereinafter more particularly described and illustrated in its preferred embodiment only, reference being had to the accompanying drawings, wherein:—

Figure 1 is a side view of culvert pipe showing the clamp engaging only one pair of shoulders. Fig. 2 is a vertical sectional view on the line 2—2 of Fig. 1. Fig. 3 is a sectional view on the line 3—3 of Fig. 1 with the pipe sections separated. Fig. 4 is a detail view of the clamp.

Similar reference numerals refer to similar parts throughout the drawings.

I have shown my invention applied to a culvert pipe which forms the subject matter of a separate application and is not, therefore, specially claimed herein. The pipe is formed by two duplicate half sections 1 and 2, each having a hub end 3, a spigot end 4, and suitable means for interlocking the hub and spigot ends of the assembled pipe units. The means I employ for interlocking the sections 1 and 2 together to form a complete pipe unit, consists in providing each section on each side with a pair of lugs which, as shown, are all similar but which, for the sake of more clearly explaining their relative arrangement, are given different reference numerals, the lugs on the left hand side of the upper section 2 (Figs. 2 and 3) being indicated by the numeral 5 and the lugs on the right hand side by the numeral 6, the lugs on the lower section 1 on the left are numbered 7 and on the right 8. It will be noted in Fig. 1 that the pair of lugs 5 on the upper section are spaced so as to be received and fit snugly between the pair of lugs 7 on the lower section. In like manner the lugs 8 on the other side of the lower pipe section 1 are adapted to be received and fit snugly between the lug 6 on the upper section, it being noted that the several lugs project substantially beyond the side edges of their respective pipe section so as to overlap the opposite pipe section and its lugs. Moreover, it will be noticed that each lug is of substantial width and thickness which causes it to project well above the surface of the pipe section by which it is carried and with which it is usually cast integral. Moreover the lug extends equidistantly above and below the side edges of the pipe section and its top and bottom edges are undercut so as to make it wedge shaped in vertical cross section. The sides of the wedges may be tapered outwardly slightly for convenience in molding and are beveled slightly toward their top and bottom ends. I provide a clamp sleeve 9 having top and bottom overhanging jaws 10, the inner faces of which are set at a slight angle to form a wedging clamp socket.

In practice, after two pipe sections have been assembled as shown in Fig. 1, to interlock them it is only necessary to take a clamp sleeve 9, insert its larger end in a horizontal direction over each lapped pair of lugs 5 and 7, or 6 and 8, and then drive the clamp longitudinally of the pipe until it tightly clamps the top and bottom edges of its respective pair of lugs, which top and bottom edges will stand in horizontal alinement. When it is noted that the manner in which the lugs themselves will serve to prevent any relative displacement horizontally of the pipe sections, it will be obvious that the use of the clamps in engaging in the manner described, the top and bottom edges of each pair of abutting lugs, will effectively hold the pipe sections against vertical displacement and by this means I avoid any necessity for bolting the sections together and I obtain a very strong and permanent fastening, all connecting parts of which can be simply and cheaply cast.

The arrangement of the two pairs of lugs at each side of a pipe unit is preferred, but the advantages of the locking means would be obtainable if a less number of lugs were used, the gist of the invention consisting in the manner in which the lugs are shaped to form a pair adapted to receive the clamp sleeve when inserted over them transversely to their line of abutment.

Having thus described my invention, what I claim as new and desire to secure by Letters Patent, is:—

1. A sectional pipe divided into longitudinal sections and means to tie said sections together against both axial, lateral, and vertical displacement, said means comprising pairs of lugs, one lug of each pair being on a different pipe section, the lugs of each pair being raised from the side of their respective pipe sections and extended beyond the section edge to overlap the side of the adjacent section, each lug having top and bottom edges that are spaced substantially equidistantly from the line on which its respective pipe section meets the adjacent section, the lugs of a pair being disposed to abut edgewise to prevent axial displacement of the pipe sections, the top and bottom edges respectively of a pair of lugs being undercut and disposed in common planes, and a clamp sleeve adapted to engage the undercut top and bottom edges of each pair of abutting lugs to prevent relative displacement of the pipe sections.

2. A pipe formed of cast half sections, and lugs cast on each section and overhanging the side edges thereof, said lugs being disposed to abut endwise in pairs when the pipe is assembled, each lug of one section overlapping the side of the other pipe section to prevent sidewise displacement of the sections, each lug being a continuation of a raised shoulder on the side of the pipe sections, each abutting pair of lugs and their shoulders forming in side elevation a wedge like sectional body raised from the side of the pipe and having its converging top and bottom edges undercut and equi-distant from the junction plane of the pipe sections, and an undercut wedge clamp sleeve adapted to be driven into engagement with said undercut edges of the lugs and shoulders, substantially as described.

3. A pipe section having along its side edges, lugs which project beyond the edges and into position to overlap the sides of the adjacent pipe section, each lug having its body continued as an integral raised shoulder on the side of the section, the end edges of the shoulder and of the lug being on opposite sides of the pipe section edge and equi-distant therefrom, and said shoulder and lug edges being reversely undercut.

4. As an article of manufacture, a pipe section having along each side edge one or more offset side lugs, which lugs rise from the surface of the pipe at a point spaced from its edge and extend a substantial distance beyond said edge, the top and bottom edges of said lug being undercut and equally spaced from the section edge, substantially as described.

In testimony whereof I affix my signature in presence of two witnesses.

SAMUEL F. KING.

Witnesses:
  NOMIE WELSH,
  R. D. JOHNSTON, Jr.

Copies of this patent may be obtained for five cents each, by addressing the "Commissioner of Patents, Washington, D. C."